INVENTOR.
Howard L. Erickson

July 9, 1968  H. L. ERICKSON  3,391,900
DIAPHRAGM FLOW CONTROL DEVICE
Filed Sept. 16, 1966  2 Sheets-Sheet 2

INVENTOR.
Howard L. Erickson
BY *Hill, Sherman, Meroni, Gross & Simpson* ATTORNEYS

United States Patent Office 3,391,900
Patented July 9, 1968

3,391,900
DIAPHRAGM FLOW CONTROL DEVICE
Howard L. Erickson, Bensenville, Ill., assignor to The Dole Valve Company, Morton Grove, Ill., a corporation of Illinois
Filed Sept. 16, 1966, Ser. No. 580,032
10 Claims. (Cl. 251—120)

This invention relates to a diaphragm flow control device and in particular relates to a novel flow control device which is multi-purpose in nature in that it has a structure which permits it to act not only as an automatic flow regulator but also as a valve seat for an externally actuated valve system.

Flow control devices are generally resilient members which are so mounted in a flow passageway that the fluid pressure applied thereto causes the flow control member to collapse in such a way as to automatically restrict the flow passage and regulate the rate of flow through the device. On the other hand members which are used as valve seats for externally operated valve means such as solenoid valve means are required to be substantially rigid in nature in order to securely seat the valve head or spring biased armature.

It is understood that it would be highly desirable to provide a single diaphragm which not only automatically regulated the rate of flow through a valve but which also provides a rigid seat for an externally operated valve system. It is also apparent that cost reductions could be effected by incorporating several valve functions into a single diaphragm. Furthermore these cost reductions could be effected not only with respect to the diaphragm itself but also with respect to the entire valve assembly.

Accordingly it is a principal object of this invention to provide a diaphragm flow control device which functions efficiently both as an automatic flow regulator and as a means for seating an external valve control.

It is another object of this invention to provide a diaphragm flow control device having a central flow passageway which is both collapsible due to increases in fluid pressure acting on the diaphragm and which is sufficiently rigid to firmly support an externally actuated valve head.

It is another object of this invention to provide a diaphragm flow control device which is permanently and compressibly seated within a flow port, which has a central flow passageway formed therethrough which automatically regulates the rate of flow through the port and which also acts as a valve seat for an external valve system.

It is an additional object of this invention to provide a diaphragm flow control device having a central flow passageway and having an annular concentric insert molded within the diaphragm for resisting fluid pressures applied thereto and for allowing a wafer portion of the resilient diaphragm to slidably respond to fluid pressures for automatically regulating the flow rate through the system.

It is another object of this invention to provide a control valve having a flow control diaphragm as described above wherein the central flow passageway has a diverging throat portion formed upstream of the valve and wherein the external valve means has a tapered valve head cooperable with the diverging throat of the diaphragm for opening and closing the valve effectively during all degrees of deformation of the diaphragm in response to excessive fluid pressures applied thereto.

These and other objects, features and advantages of the present invention will be understood in greater detail from the following description and the associated drawings wherein reference numerals are utilized in designating an illustrative embodiment and wherein.

This invention concerns generally a diaphragm flow control device which is so mounted in a valve structure as to perform several functions. In particular the diaphragm flow control device of this invention is rigidly and compressibly seated about a flow port and to that extent controls the flow of fluid through the port. The diaphragm has a built-in means for automatically regulating the rate of flow of fluid through the system, provides a means for seating a valve head associated with an armature of a solenoid type valve, and provides a means for sealably mounting the solenoid valve means to the valve body.

Figure 1:
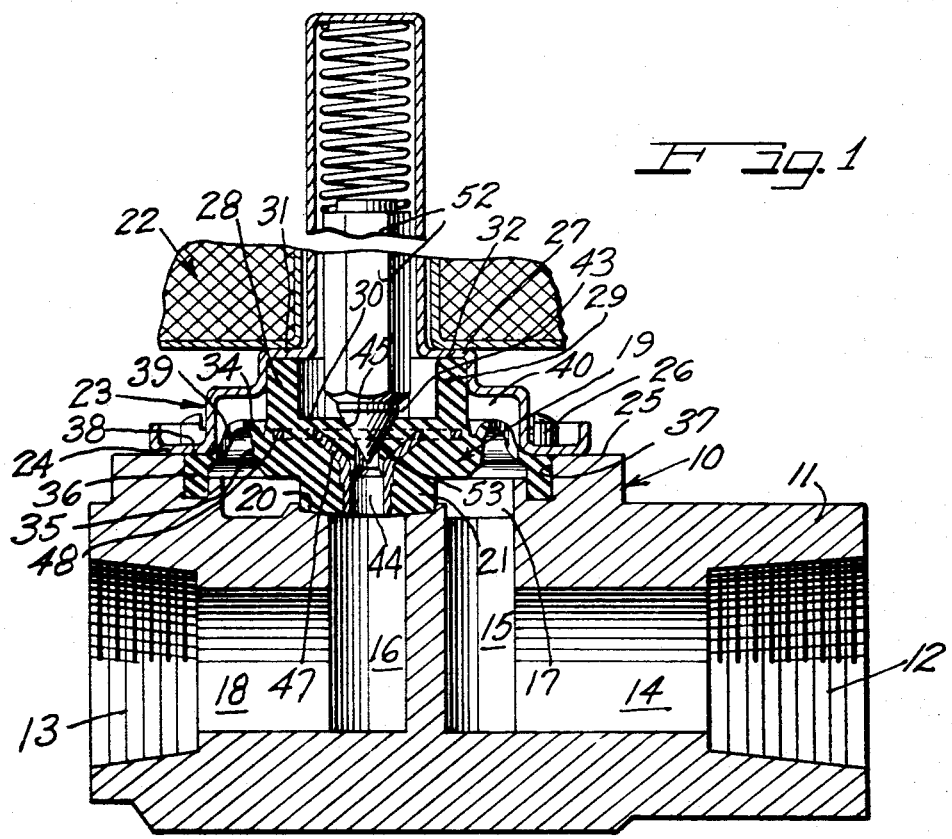
FIGURE 1 is a sectional view of a valve incorporating a diaphragm flow control device in accordance with this invention.

Referring to the drawings in greater detail, a valve 10 in FIGURE 1 is shown to comprise a valve body 11 having an inlet 12 and an outlet 13. A flow port connects the inlet 12 with the outlet 13 and comprises a first passageway 14 substantially aligned with the inlet 12, right angle passageways 15 and 16 which are interconnected by an annular passageway 17, and a further passageway 18 which is substantially aligned with the outlet 13.

A diaphragm flow control device 19 is disposed within the annular passageway 17 and controls the flow of fluid between the passageways 15 and 16. In particular, the passageway 16 has a seat 20 formed thereabout, and the diaphragm 19 has a boss 21 firmly seated at the seat 20. The compression applied to the boss 21 at the seat 20 is accomplished by the proper positioning of a solenoid valve actuator 22 on the valve body.

The solenoid valve assembly 22 has an armature guide 23 which has a flange portion 24 rigidly mounted to a surface 25 of the valve body 11 by a series of connectors 26 and has a step portion 27 for compressing the resilient diaphragm 29 against the seat 20.

To utilize the armature guide 23 for positioning the diaphragm 19 against the seat 20, the diaphragm 19 is provided with substantially rigid tabs 28 and 29 extending upwardly from the surface 30 of the diaphragm 19. The tabs 28 and 29 are tightly fitted within the interior of the step portion 27 of the armature guide 23. For this purpose, the tabs 28 and 29 have top surfaces 31 and 32 which in a non-stressed condition extend above the position shown in FIGURE 1 and which when the armature guide 23 is tightly secured to the surface 25 of the valve body 11 are compressed by the step portion 27 to urge the entire diaphragm 19 downwardly against the seat 20.

Since fluid pressure exists within the annular passageway 17, means must be provided to seal the armature guide 23 against the valve body 11. Accordingly the diaphragm 19 is provided with a web 34 which extends radially outwardly from a surface 35 of the diaphragm and which is terminated in a bead 36 formed about the periphery of the web 34. The bead 36 is compressed within a groove 37 formed within the valve body 11. The flange 24 of the armature guide 23 abuts the upper surface 38 of the bead 36 and tightly seals the junction of the armature guide at the valve body. The web 34 has a series of flow ports 39 formed therein to allow the flow of fluid to pass from the annular chamber 17 to a region 40 at the upper surface of the diaphragm 19. It is understood that the tabs 28 and 29 have spaces 41 and 42 formed therebetween to allow the flow of fluid from the region 40 to a region 43 intermediate the tabs 28 and 29.

To allow the flow of fluid from the region 43 to the passageway 16, the diaphragm 19 is provided with a central flow passageway 44. The flow passageway 44 extends from the region 43 to the passageway 16 and has a diverging neck portion 45 facing upstream therefrom.

An annular insert 46 is molded within the resilient diaphragm 19, and also has a diverging neck portion 47 facing upstream of the valve. In addition, the insert 46 has a flange 48 which extends substantially perpendicular to the central flow passageway 44 and which has a series of apertures 49 formed therein. The apertures 49 are molded directly with the diaphragm 19 and accordingly give substantial rigidity to the positioning of the annular insert 46 relative to the valve body 11 of the valve system 10. Also, when the substantially rigid tabs 28 and 29 are compressed between the step portion 27 of the armature guide 23 and the seat 20, the flange 48 is even more rigidly positioned relative to the valve body than would be otherwise possible.

The surface 50 of the insert 46 is coated or plated with a low friction material to reduce or substantially eliminate sticking between a wafer portion 51 of the diaphragm 19 and the surface 50 of the insert 46. It has been found that when fluid pressure is applied to the surface 30 of the resilient diaphragm 19, the wafer portion 51 of the diaphragm is forced into the central passageway 44 to automatically constrict that passageway and thereby restrict the flow of fluid therethrough. This portion of the valve therefore acts as a flow control.

However, due to the rigidity imparted by the annular insert 46, the diverging throat portion 45 of the diaphargm 19, despite its use as a collapsible flow control device, is sufficiently rigid to permit the seating of a valve member thereagainst. In particular, an armature 52 associated with the solenoid valve 22 has a tapered head 53 which may be sealably seated against the diverging throat portion 45 of the diaphragm 19, thereby closing the valve. This is true even though the wafer portion 51 of the diaphragm may be deformed or collapsed due to high fluid pressure exerted at the surface 30.

Figure 2:
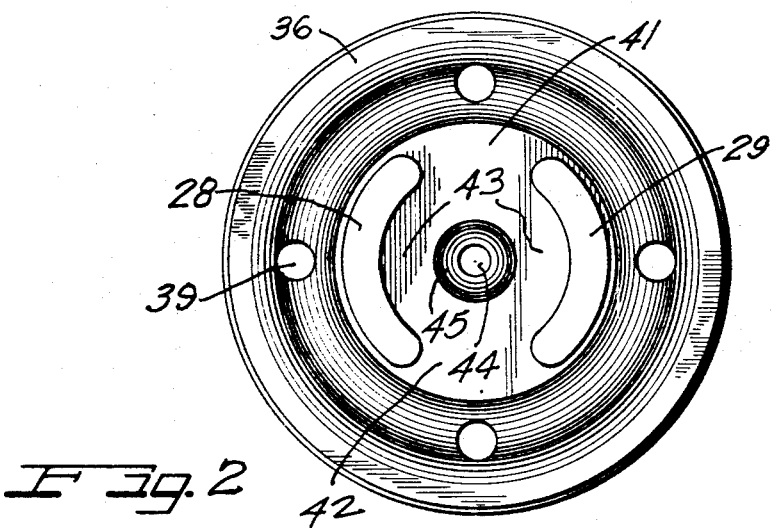
FIGURE 2 is a top view of a diaphragm as utilized in the valve system of FIGURE 1.
Figure 3:
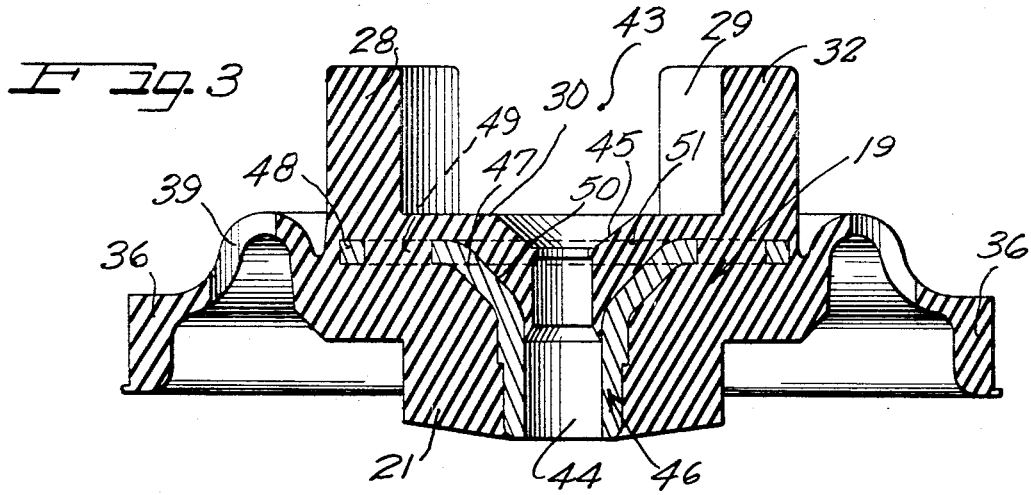
FIGURE 3 is an enlarged sectional view through a diaphragm flow control device of this invention.
Figure 4:
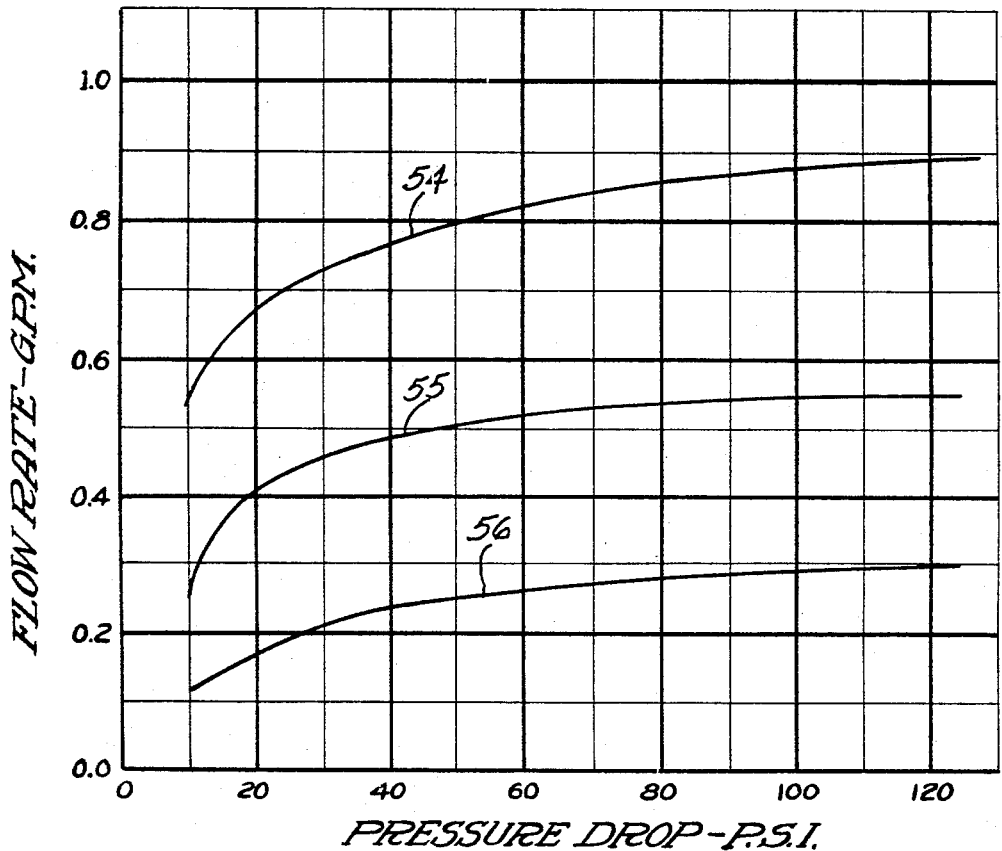
FIGURE 4 is a graphical illustration of the flow control effectiveness of the resilient diaphragm shown in FIGURE 3.

FIGURE 4 shows a series of curves 54, 55 and 56 which show the rate of flow through the central passageway 44 as a function of the pressure across the surface of the diaphragm. These curves are experimental results for increasing diameter passageways, with the curve 54 representing the largest diameter for the passageway 44. It can be seen from these curves and from FIGURES 1, 2 and 3 that the diaphragm flow control device of this invention operates effectively both as a means for automatically maintaining a substantially constant rate of flow regardless of the fluid pressure involved and for providing a substantially rigid means for seating the armature of the solenoid valve.

It will be understood that various modifications and combinations of the features of this invention may be accomplished by those versed in the art, but I desire to claim all such modifications and combinations that properly come within the spirit and scopue of my invention.

I claim:

1. A diaphragm flow control device comprising:
   a resilient diaphragm having a central fluid passageway formed therethrough,
   a resilient boss formed at a first side of the diaphragm and having a valve seat formed thereon about said central fluid passageway,
   an annular insert molded within said diaphragm and formed concentrically with said central fluid passageway,
   said annular insert having a diverging neck portion facing away from said first side of the diaphragm,
   a wafer of pressure deformable material overlying said diverging neck portion,
   means disposed between said wafer and said neck portion to reduce the sliding friction therebetween, and
   substantially rigid tabs extending from a second side of the diaphragm oppositely of said first side and giving rigidity to said diaphragm.

2. A diaphragm flow control device in accordance with claim 1 wherein said annular insert has a flange thereof extending substantially perpendicular to the axis of said central fluid passageway, wherein said flange has a series of apertures formed therein and wherein said diaphragm is molded into said apertures for resisting movement due to fluid pressures applied to said wafer of pressure deformable material.

3. A diaphragm flow control device in accordance with claim 2 wherein said flange extends within said diaphragm between said resilient boss and said substantially rigid tabs thereby rigidly supporting said annular insert about the central fluid passageway during deformation of said wafer due to fluid pressure exerted thereagainst.

4. A diaphragm flow control in accordance with claim 1 wherein said resilient diaphragm has a web formed about said boss wherein said web has a series of flow ports formed therein and wherein a resilient bead is formed at the periphery of said web for providing a sealing means.

5. In a fluid control valve including a valve body having an inlet and an outlet and a port communicating said inlet with said outlet,
   a diaphragm flow control device having a resilient boss sealably seated within said port for controlling the flow of fluid therethrough,
   said boss having a central fluid passageway extending therethrough,
   valve means mounted on said control valve,
   said valve means having a valve head cooperable with said central fluid passageway for controlling the flow of fluid therethrough,
   an annular insert molded within said diaphragm and formed concentrically with said central fluid passageway,
   said annular insert having a diverging neck portion facing upstream of said port,
   a wafer of pressure deformable diaphragm material overlying said diverging neck portion, and
   means for lockingly holding said resilient diaphragm in a fixed position within said port.

6. A fluid control valve in accordance with claim 5 wherein means are disposed between said wafer of pressure deformable material and said neck portion to reduce the sliding friction therebetween and to allow said wafer to be readily urged into said central passageway by fluid pressure applied thereagainst for maintaining a substantially constant flow of fluid therethrough.

7. A fluid control valve in accordance with claim 5 wherein substantially rigid tabs are formed on the upstream side of said resilient boss and wherein said valve means has a housing portion securely abutting said tabs and compressing said resilient boss into sealing engagement with said valve body about said port.

8. A fluid control valve in accordance with claim 7 wherein said resilient boss has a diaphragm web formed thereabout, said web having a bead formed at the periphery thereof and having a series of flow passages formed within the web, said bead being sealably disposed between said housing portion of the valve means and said valve body and causing said web to overlie said port.

9. A fluid control valve in accordance with claim 8 wherein said valve means comprises a solenoid operated valve having an armature affixed to said valve head and energizable therein for opening and closing said central fluid passageway, wherein said central fluid passageway has a diverging wall portion facing upstream thereof and wherein said valve head has a tapered end face cooperable with said diverging wall portion of said central passageway for controlling the flow of fluid therethrough under all conditions of pressure deformation of said diaphragm.

10. A fluid control valve in accordance with claim 8 wherein the flow passages formed within said web have a larger combined effective flow area than the largest effective flow area of said central passageway.

References Cited
UNITED STATES PATENTS

| | | | |
|---|---|---|---|
| 2,716,427 | 8/1955 | Cantalupo | 138—45 |
| 2,781,058 | 2/1957 | Warhus | 138—45 |
| 2,993,676 | 7/1961 | Dahl | 251—38 |

M. CARY NELSON, *Primary Examiner.*

ARNOLD ROSENTHAL, *Assistant Examiner.*